United States Patent
Li et al.

(10) Patent No.: US 9,578,665 B2
(45) Date of Patent: Feb. 21, 2017

(54) METHOD AND APPARATUS FOR PERFORMING D2D COMMUNICATION

(75) Inventors: Chaofeng Li, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 74 days.

(21) Appl. No.: 14/384,334

(22) PCT Filed: Jun. 6, 2012

(86) PCT No.: PCT/CN2012/076519
§ 371 (c)(1),
(2), (4) Date: Dec. 11, 2014

(87) PCT Pub. No.: WO2013/181807
PCT Pub. Date: Dec. 12, 2013

(65) Prior Publication Data
US 2015/0133132 A1    May 14, 2015

(51) Int. Cl.
*H04W 76/02* (2009.01)
*H04W 52/24* (2009.01)
(Continued)

(52) U.S. Cl.
CPC .......... *H04W 76/023* (2013.01); *H04L 1/0002* (2013.01); *H04L 1/0021* (2013.01); *H04L 1/1867* (2013.01); *H04W 52/246* (2013.01)

(58) Field of Classification Search
CPC . H04W 76/023; H04W 52/246; H04L 1/0002; H04L 1/1867
See application file for complete search history.

(56) References Cited

U.S. PATENT DOCUMENTS

2005/0160345 A1* 7/2005 Walsh ................... H04L 1/1812
                                                              714/776
2005/0182995 A1   8/2005 Curcio et al.
(Continued)

FOREIGN PATENT DOCUMENTS

CN        1922813 A     2/2007
CN      101069373 A    11/2007
(Continued)

OTHER PUBLICATIONS

International Search Report for PCT/CN2012/076519, dated Mar. 14, 2013.
(Continued)

*Primary Examiner* — Lester Kincaid
*Assistant Examiner* — William Wang
(74) *Attorney, Agent, or Firm* — Sughrue Mion, PLLC

(57) ABSTRACT

Embodiments of the disclosure provide methods and apparatuses for performing D2D communication in a communication system. The communication system may at least comprise a base station (BS), a D2D transmitter and a D2D receiver. The D2D transmitter transmits D2D data to the D2D receiver in a D2D communication. According to the method of the present invention, D2D data may be received from the D2D transmitter; and the received D2D data may be transmitted to the D2D receiver in response to receiving a negative message from the D2D receiver, wherein the negative message indicates that the D2D receiver fails to receive the D2D data from the D2D transmitter.

20 Claims, 6 Drawing Sheets

(51) Int. Cl.
*H04L 1/00* (2006.01)
*H04L 1/18* (2006.01)

(56) References Cited

U.S. PATENT DOCUMENTS

| | | | | |
|---|---|---|---|---|
| 2010/0261469 A1* | 10/2010 | Ribeiro | ................ | H04W 99/00 |
| | | | | 455/423 |
| 2011/0275382 A1* | 11/2011 | Hakola | ................ | H04W 24/10 |
| | | | | 455/452.2 |
| 2011/0306349 A1* | 12/2011 | Hakola | ................ | H04W 28/04 |
| | | | | 455/450 |

FOREIGN PATENT DOCUMENTS

| | | |
|---|---|---|
| JP | 2003-283513 A | 10/2003 |
| JP | 2008-510344 A | 4/2008 |

OTHER PUBLICATIONS

Communication dated Sep. 29, 2015 from the Japanese Patent Office in counterpart application No. 2014-560213.

* cited by examiner

500

Start

S501 in response to failing to receive D2D data from the D2D transmitter, send a negative message to the D2D transmitter and the BS S502 receive the D2D data from the BS End

Start

S601 transmit the D2D data to the D2D receiver and the BS, so that the BS transmits the D2D data to the D2D receiver in response to receiving a negative message from the D2D receiver End

FIG. 6

METHOD AND APPARATUS FOR PERFORMING D2D COMMUNICATION

FIELD OF THE INVENTION

Embodiments of the present invention generally relate to communication techniques. More particularly, embodiments of the present invention relate to a method and apparatus for performing D2D (Device-to-Device) communication in a communication system.

BACKGROUND OF THE INVENTION

In practical communication networks, such as networks employs GSM, CDMA, UMTS and LTE technologies, wireless communication users' demand for faster, more reliable, and better multimedia is growing. To accommodate such a growing demand, research to provide a higher throughput is being researched.

Due to the increasing demand for higher throughput, the tendency of offloading cellular network traffic has received enormous attention, e.g., femto and other small cells. Increasing demand of offloading cellular traffic has attracted attention from most industrial partners to D2D communication. The aim of D2D communication is pursuing this track to allow D2D devices to transmit data to each other without, or with limited help from the infrastructure. According to an existing and common scheme for performing the D2D communication between D2D devices comprising a D2D transmitter (D2D Tx) and a D2D receiver (D2D Rx), D2D data or D2D traffic may be transmitted from the D2D transmitter to the D2D receiver.

In order to efficiently utilizing spectrum, same frequency band is allowed to be shared by both cellular user equipments (UEs) and the D2D devices. That is to say, the D2D communication may share the same frequency band with cellular communication. In such a case, the D2D communication may interfere with the cellular communication. The interference would highly degrade the communication quality, as well as reduce cell throughput for the cellular communication, especially in uplink.

Traditional methods, coping with this issue, generally treated D2D signal which is transmitted from the D2D transmitter to the D2D receiver as interference and mitigated the signal from the D2D transmitter to reduce the interference. However, these traditional methods cannot completely remove the interference.

In view of the foregoing problem, there is a need to reduce the interference from D2D communication to cellular communication, so as to effectively improve performance of a communication system comprising both the D2D communication and the cellular communication.

SUMMARY OF THE INVENTION

The present invention proposes a solution which removes the interference from D2D communication to cellular communication. Specifically, the present invention provides a method and apparatus for performing D2D communication in a communication system, which effectively improves performance of the communication system comprising both the D2D communication and the cellular communication.

According to a first aspect of embodiments of the present invention, embodiments of the invention provide a method for performing D2D communication in a communication system. The communication system may at least comprise a base station (BS), a D2D transmitter and a D2D receiver. The D2D transmitter may transmit D2D data to the D2D receiver in a D2D communication. The method may comprise: receiving D2D data from the D2D transmitter; and in response to receiving a negative message from the D2D receiver, transmitting the received D2D data to the D2D receiver, wherein the negative message indicates that the D2D receiver fails to receive the D2D data from the D2D transmitter.

According to a second aspect of embodiments of the present invention, embodiments of the invention provide a method for performing D2D communication in a communication system. The communication system may at least comprise a base station (BS), a D2D transmitter and a D2D receiver. The D2D transmitter may transmit D2D data to the D2D receiver in a D2D communication. The method may comprise: in response to failing to receive D2D data from the D2D transmitter, sending a negative message to the D2D transmitter and the BS; and receiving the D2D data from the BS.

According to a third aspect of embodiments of the present invention, embodiments of the invention provide a method for performing D2D communication in a communication system. The communication system may at least comprise a base station (BS), a D2D transmitter and a D2D receiver. The D2D transmitter may transmit D2D data to the D2D receiver in a D2D communication. The method may comprise: transmitting D2D data to the D2D receiver and the BS, so that the BS transmits the D2D data to the D2D receiver in response to receiving a negative message from the D2D receiver.

According to a fourth aspect of embodiments of the present invention, embodiments of the invention provide an apparatus for performing D2D communication in a communication system. The communication system may at least comprise a base station (BS), a D2D transmitter and a D2D receiver. The D2D transmitter may transmit D2D data to the D2D receiver in a D2D communication. The apparatus may comprise: a first data receiving unit configured to receive D2D data from the D2D transmitter; and a first data transmitting unit configured to transmit the received D2D data to the D2D receiver in response to receiving a negative message from the D2D receiver, wherein the negative message indicates that the D2D receiver fails to receive the D2D data from the D2D transmitter.

According to a fifth aspect of embodiments of the present invention, embodiments of the invention provide an apparatus for performing D2D communication in a communication system. The communication system may at least comprise a base station (BS), a D2D transmitter and a D2D receiver. The D2D transmitter may transmit D2D data to the D2D receiver in a D2D communication. The apparatus may comprise: a first sending unit configured to send a negative message to the D2D transmitter and the BS in response to failing to receive D2D data from the D2D transmitter; and a second data receiving unit configured to receive the D2D data from the BS.

According to a sixth aspect of embodiments of the present invention, embodiments of the invention provide an apparatus for performing D2D communication in a communication system. The communication system may at least comprise a base station (BS), a D2D transmitter and a D2D receiver. The D2D transmitter may transmit D2D data to the D2D receiver in a D2D communication. The apparatus may comprise: a second data transmitting unit configured to transmit D2D data to the D2D receiver and the BS, so that the BS transmits the D2D data to the D2D receiver in response to receiving a negative message from the D2D receiver.

Compared with those existing solutions, the proposed solution copes with the interference of D2D transmitter as useful signals and increases the diversity of the D2D devices, so that the cell throughput may be effectively improved and effective D2D transmission rate may be maintained.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where

FIG. 5 illustrates a flow chart of a method 500 for performing D2D communication in a communication system according to embodiments of the invention;

FIG. 6 illustrates a flow chart of a method 600 for performing D2D communication in a communication system according to embodiments of the invention;

Throughout the figures, same or similar reference numbers indicate same or similar elements.

DETAILED DESCRIPTION OF EMBODIMENTS

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

In the disclosure, a base station (BS) may refer to a node B (NodeB or NB), an evolved NodeB (eNodeB or eNB), or any other suitable device managing a cell.

Figure 1:
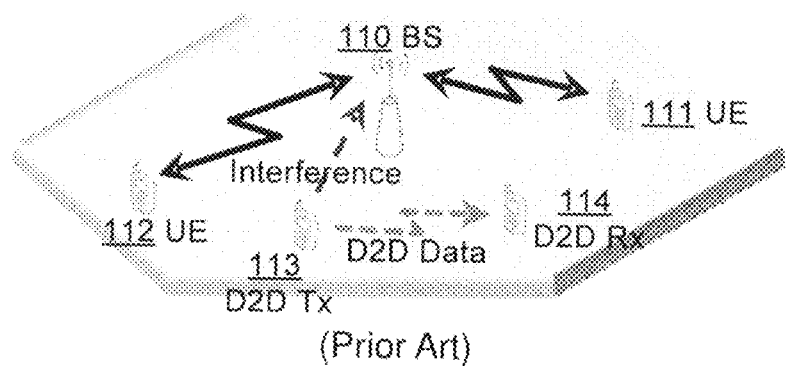
FIG. 1 illustrates a schematic diagram of a communication system in which the cellular communication is interfered by the D2D communication according to the prior art.

Reference is first made to FIG. 1, which illustrates a schematic diagram of a communication system in which the cellular communication is interfered by the D2D communication according to the prior art.

The communication system of FIG. 1 may be implemented with a GSM system, a CDMA system, a UMTS system, a LTE system, etc. The system illustratively comprises a BS 110, a UE 111, a UE 112, a D2D transmitter 113 and a D2D receiver 114. In the system, the UE 111 and the UE 112 are being served by the BS 110, specifically, the UE 111 and the UE 112 are communicating with the BS 110 (that is to say, the UE 111 and the UE 112 are in cellular communication with the BS 110). Meanwhile, the D2D transmitter 113 and a D2D receiver 114 are in D2D communication, specifically, the D2D transmitter 113 is transmitting D2D data to the D2D receiver 114.

As can be seen from FIG. 1, during the D2D communication, especially when the D2D transmitter 113 is transmitting data to the D2D receiver 114, the BS 110 may suffer the interference from the D2D transmitter 113 when the BS 110 is in the uplink cellular communication with the UE 111 and/or the UE 112. At this time, the BS 110 may be considered as a "victim receiver".

Figure 2:
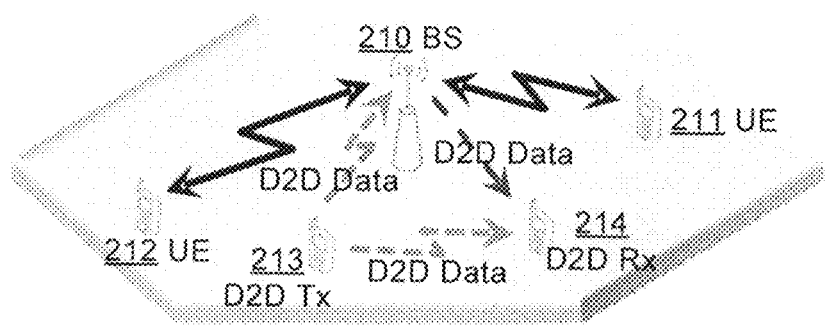
FIG. 2 illustrates a schematic diagram of a communication system in which the cellular communication is not interfered by the D2D communication according to embodiments of the invention.

Reference is now made to FIG. 2, which illustrates a schematic diagram of a communication system in which the cellular communication is not interfered by the D2D communication according to embodiments of the invention.

Similar to FIG. 1, the communication system according to embodiments of the invention may also be implemented with a GSM system, a CDMA system, a UMTS system, a LTE system, etc. The system as illustrated in FIG. 2 comprises a BS 210, a UE 211, a UE 212, a D2D transmitter 213 and a D2D receiver 214. In the system, the UE 211 and the UE 212 are in cellular communication with the BS 210, and meanwhile, the D2D transmitter 213 is transmitting D2D data to the D2D receiver 214 in D2D communication. As can be appreciated by those skilled in the art, in other embodiments of the present invention, in another D2D communication, the D2D receiver 214 may play a role of a D2D transmitter for transmitting D2D data and the D2D transmitter 213 may play a role of a D2D receiver for receiving the D2D data. Thus, the D2D transmitter 213 and the D2D receiver 214 are only illustrated in FIG. 2 for example, rather than limitation.

As can be seen from FIG. 2, during the D2D communication according to embodiments of the present invention, the D2D transmitter 213 transmits D2D data to the D2D receiver 214 as well as the BS 210. According to embodiments of the present invention, the BS 210 may act as a relay for forwarding the D2D data to the D2D receiver 214 in response to that the D2D receiver 214 fails to receive the D2D data from the D2D transmitter 213. As such, the D2D data is no longer interference to the BS 210 but useful signals. Accordingly, the system throughput will be significantly improved due to the removed interference.

According to embodiments of the present invention, the D2D transmitter and the D2D receiver may be located within one cell, or located in different neighboring cells. In embodiments where the D2D transmitter and the D2D receiver are located within one cell, the BS managing the cell may act as a relay for the D2D transmission. In other embodiments where the D2D transmitter and the D2D receiver are located in different neighboring cells, the BS managing the cell in which the D2D transmitter is located may act as a relay for the D2D transmission.

It is to be noted that, according to other embodiments of the present invention, the communication system may comprise no UE or at least one UE in cellular communication with the BS. Thus, for both the case that the BS is not serving a UE and the case that the BS is serving one or more UEs, the embodiments of the present invention are applicable. The UE 211 and the UE 212 shown in FIG. 2 are only for example, not for limitation.

Figure 3:
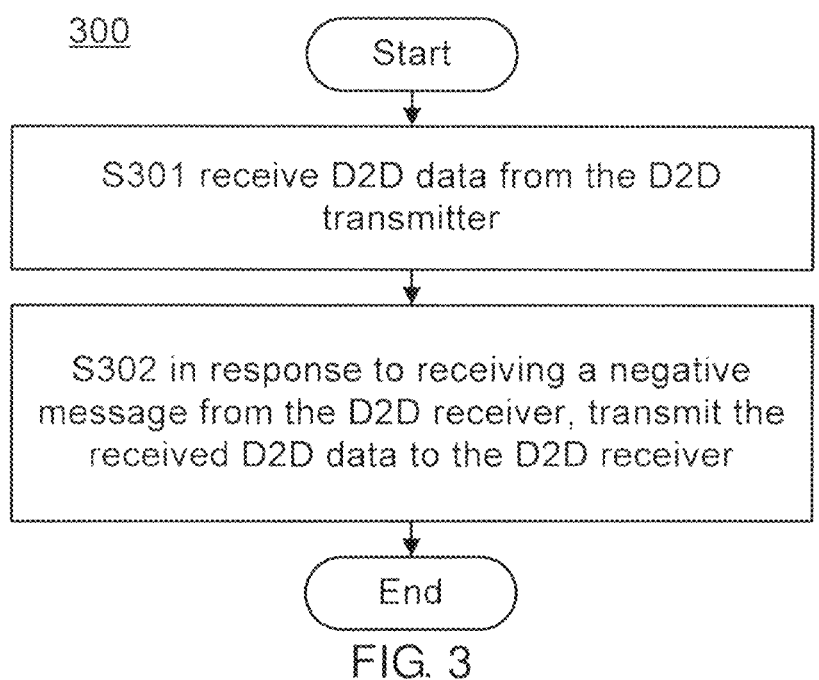
FIG. 3 illustrates a flow chart of a method 300 for performing D2D communication in a communication system according to embodiments of the invention.

Reference is now made to FIG. 3, which illustrates a flow chart of a method 300 for performing D2D communication in a communication system according to embodiments of the invention. According to embodiments of the present invention, the communication system may at least comprise a BS, a D2D transmitter and a D2D receiver, and the D2D transmitter may transmit D2D data to the D2D receiver in a D2D communication. According to embodiments of the present invention, the communication system may be implemented as a GSM system, a CDMA system, a UMTS system, a LTE system, etc., such as the system illustrated in FIG. 2. In accordance with embodiments of the present invention, the method 300 may be carried out by, for example, a base station, a base station controller (BSC), a gateway, a relay, a server, or any other applicable device.

After method 300 starts, at step S301, D2D data is received from the D2D transmitter.

As discussed above, in the existing D2D solutions, the BS does not receive the D2D data from the D2D transmitter, but suffers the interference caused by the D2D data. In contrast, in accordance with embodiments of the present invention, the BS may receive the D2D data from the D2D transmitter. As such, the D2D data transmitted from the D2D transmitter is no longer the interference but useful signals for the BS.

At step S302, the received D2D data is transmitted to the D2D receiver in response to receiving a negative message from the D2D receiver. The negative message may indicate that the D2D receiver fails to receive the D2D data from the D2D transmitter.

According to embodiments of the present invention, after receiving the D2D data from the D2D transmitter, the BS may store the received D2D data for further use, e.g., for transmitting the received D2D data to the D2D receiver when the D2D receiver does not successfully receive the D2D data from the D2D transmitter. In some embodiments, the D2D data may be stored in a memory, for example, semiconductor memory devices accessible to the BS, such as, RAM, ROM, EPROM, EEPROM, flash memory devices, etc. In this regard, it is seems that the BS acts as a relay for forwarding the D2D data. According to embodiments of the present invention, several forwarding schemes may be employed in the relay process, such as Amplify-and-Forward, Incremental Amplify-and-Forward, Decode-and-Forward, Selection Decode-and-Forward, and so on. It is noted that the above forwarding schemes are only for the purpose of illustration, rather than limitation.

In response to receiving a negative message from the D2D receiver, the BS may determine that the D2D receiver does not successfully receive the D2D data from the D2D transmitter, and then may transmit the D2D data to the D2D receiver to guarantee successful transmission of the D2D data.

In accordance with embodiments of the present invention, before the D2D transmission states, the method 300 may determine a D2D transmission power for transmitting the D2D data from the D2D transmitter. In an embodiment, at least one UE is served by the base station (BS), and the D2D transmission power for transmitting the D2D data may be determined by following operations: obtaining a channel quality of the D2D communication; determining whether the channel quality exceeds a predetermined threshold; responsive to determining that the channel quality exceeds a predetermined threshold, calculating the D2D transmission power and at least one cellular transmission power for the at least one UE so as to maximize throughput of the communication system; and responsive to determining that the channel quality does not exceed the predetermined threshold, determining a full power of the D2D transmitter as the D2D transmission power, and a full power of the at least one UE as the at least one cellular transmission power.

In accordance with embodiments of the present invention, a D2D rate required by the D2D communication may be first obtained and whether the BS is qualified as a relay in the D2D communication may be then determined based on the D2D rate. In an embodiment, whether the BS is qualified as a relay may be determined by: calculating a candidate rate based on power limitation for the D2D transmitter and a channel from the D2D transmitter to the BS, or based on power limitation for the BS and a channel from the BS to the D2D receiver; determining whether the candidate rate exceeds the D2D rate; responsive to determining that the candidate rate exceeds the D2D rate, determining that the BS is qualified as a relay in the D2D communication; and responsive to determining that the candidate rate does not exceed the D2D rate, determining that the BS is not qualified as a relay in the D2D communication.

With respect to embodiments illustrated by FIG. 3, it is advantageous that, different from the existing solutions, in the uplink cellular transmission, the D2D transmitter may act as a UE served by the BS, and the BS treats the D2D data as uplink signals. As such, the BS will not be interfered by the D2D data transmitted from the D2D transmitter to the D2D receiver.

Figure 4:
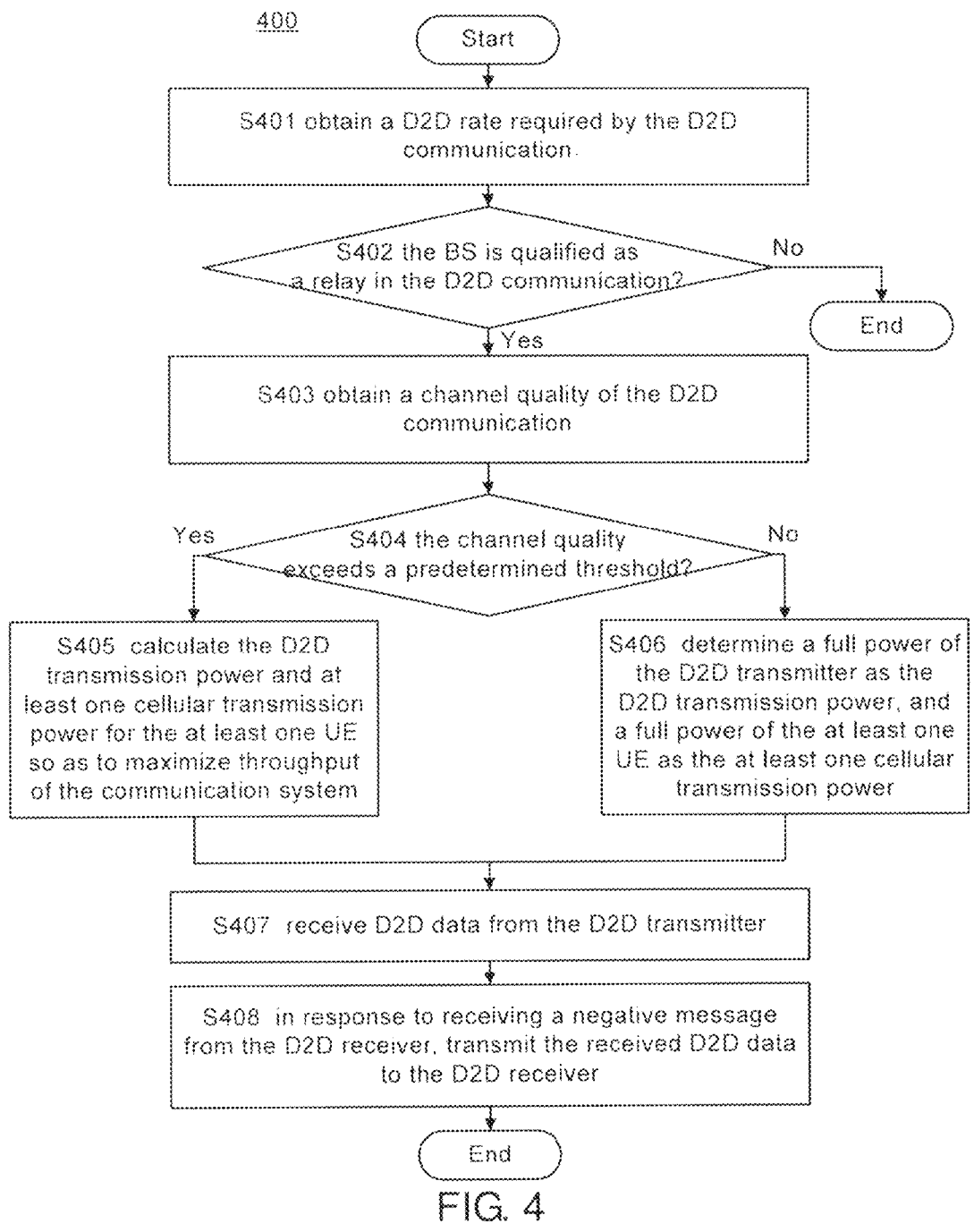
FIG. 4 illustrates a flow chart of a method 400 for performing D2D communication in a communication system according to further embodiments of the invention.

Reference is now made to FIG. 4, which illustrates a flow chart of a method 400 for performing D2D communication in a communication system according to further embodiments of the invention. Method 400 may be considered as an embodiment of method 300 described above with reference to FIG. 3. In the following description of method 400, optionally, whether the BS is qualified as a relay in the D2D communication is judged and the transmission power of the D2D data is determined. However, it is noted that this is only for the purpose of illustrating the principles of the present invention, rather than limiting the scope thereof.

After method 400 starts, at step S401, a D2D rate required by the D2D communication is obtained.

According to embodiments of the present invention, D2D rate required by the D2D communication may be obtained in several ways. For example, the D2D rate may be set according to experience of the operator of the communication system or those skilled in the art. For another example, the D2D rate may be calculated according to concrete communication conditions of the communication system. For further example, the D2D rate may be predicted based on historical information of the D2D communication. It is to be noted that the above examples are described for illustration, and the D2D rate may be obtained in other ways besides the above examples.

At step S402, whether the BS is qualified as a relay in the D2D communication is determined based on the D2D rate.

According to embodiments of the present invention, a candidate rate for the D2D communication supported by the communication system may be determined, so as to judge whether BS is qualified as a relay in the D2D communication under current communication circumstance.

In accordance with embodiments of the present invention, the candidate rate may be determined in several ways. In an embodiment, the candidate rate may be determined based on power limitation for the D2D transmitter and a channel from the D2D transmitter to the BS. In particular, the candidate rate may be calculated by:

$$\log\left(1 + \frac{\|h_{d,BS}\|^2 \overline{P}_d}{\sigma^2}\right), \quad (1)$$

wherein $h_{d,BS}$ represents the uplink channel from the D2D transmitter to the BS, $\overline{P}_d$ represents the power limitation for the D2D transmitter, and $\sigma^2$ denotes the Gaussian noise at the receiver side, i.e., the BS.

In another embodiment, the candidate rate may be determined based on power limitation for the BS and a channel from the BS to the D2D receiver. In particular, the candidate rate may be calculated by:

$$\log\left(1 + \frac{\|h_{BS,d}^T\|^2 \overline{P}_{BS}}{\sigma^2}\right), \quad (2)$$

wherein $h_{BS,d}^T$ represents the downlink channel from the BS to the D2D receiver, $\overline{P}_{BS}$ represents the power limitation for the BS, and $\sigma^2$ denotes the Gaussian noise at the receiver side, i.e., the D2D receiver.

It is to be noted that the candidate rate may be calculated in several other ways besides equations (1) and (2), and the above equations (1) and (2) are illustrated for purpose of example, rather than limitation.

After determining the candidate rate, whether the candidate rate exceeds the D2D rate may be determined. In some embodiments, it may be determined that the BS is qualified as a relay in the D2D communication responsive to determining that the candidate rate exceeds the D2D rate; and it may be determined that the BS is not qualified as a relay in the D2D communication responsive to determining that the candidate rate does not exceed the D2D rate.

With respect to step S402, if it is determined that the BS is qualified as a relay in the D2D communication, the flow of the method 400 proceeds to step S403; otherwise, the flows ends up.

As can be appreciated by those skilled in the art, the aforesaid steps S401 and S402 are optional steps for the method according to the present invention. For a communication system with good communication conditions which always support the D2D communication, steps S401 and S402 may be omitted.

At step S403, a channel quality of the D2D communication is obtained.

According to embodiments of the present invention, the channel quality may comprise information which reflects the quality of the channel between the D2D transmitter and the D2D receiver. For example, the channel quality information may comprise signal to interference plus noise ratio (SINR), Signal to Noise Ratio (SNR), Signal to Interference Ratio (SIR), Carrier to Interference plus Noise Ratio (CINR), Carrier to Noise Ratio (CNR), and so on.

In this embodiment, the channel quality information is exemplarily the SINR. As such, the SINR of the channel between the D2D transmitter and the D2D receiver may be obtained at step S403. It is to be noted that, in other embodiments of the present invention, the channel quality information may further comprise SNR, SIR, CINR, CNR or any combination of SINR, SNR, SIR, CINR, and CNR.

At step S404, whether the channel quality exceeds a predetermined threshold is determined.

The predetermined threshold is a threshold for evaluating the channel quality, e.g. the SINR obtained at step S403. According to embodiments of the present invention, such threshold may be predetermined in several ways. For example, the threshold may be predetermined according to experience of an operator of the communication system or those skilled in the art; the threshold may also be predetermined according to concrete communication conditions of the communication system; additionally, the threshold may be predetermined based on historical information of the D2D communication. It is to be noted that the above examples are described for illustration, and the threshold may be obtained in other ways besides the above examples.

Compared with the predetermined threshold, if it is determined that the channel quality exceeds a predetermined threshold, the flow of the method 400 proceeds to step S405 to calculate the D2D transmission power and the cellular transmission power(s); and if it is determined that the channel quality does not exceed a predetermined threshold, the flow of the method 400 proceeds to step S406 to use the full powers.

At step S405, the D2D transmission power and at least one cellular transmission power for the at least one UE are calculated so as to maximize throughput of the communication system.

This step is performed in response to that the channel quality of the D2D communication exceeds a predetermined threshold. According to embodiments of the present invention, the channel quality being higher than the predetermined threshold may indicate that the channel quality of the D2D communication is relatively good, thus the D2D communication is not in outage. In this case, transmission power of the D2D transmitter (i.e., the D2D transmission power) and that of the at least one UE (i.e., the cellular transmission power) may be calculated according to certain policies. For example, one policy may comprise maximizing throughput of the communication system. Accordingly, the D2D transmission power and the at least one cellular transmission power may be calculated as follows:

$$\max_{Q_d, Q_i \in S} \sum_{i \in S} \log\left(\frac{\|v_i h_i\|^2}{\sigma^2}\right) + Q_i, \quad (3)$$

$$\text{s.t. } \log(1-\epsilon) + \frac{\sigma^2(e^{R_d}-1)}{\bar{g}_d} e^{-Q_d} +$$

$$\sum_{i \in S} \log\left(1 + \frac{\bar{g}_{i,d}(e^{R_d}-1)}{\bar{g}_d} e^{Q_i - Q_d}\right) < 0$$

$$Q_i \leq \log(\overline{P}_c), \log\left(\frac{(e^{R_d}-1)\sigma^2}{\|v_d h_{d,BS}\|^2}\right) \leq Q_d \leq \log(\overline{P}_d)$$

In the above equation (3), the first row denotes the throughput to be maximized, and the subsequent three rows indicate three constraints to be subjected to, wherein the first constraint indicates that the probability for interrupting the D2D communication should be less than a predetermined value, e.g., $\epsilon$. Specifically, in the equation (3), S indicates a subset of UEs which are in cellular communications; the UEs in this subset are scheduled as the activated UEs in the upcoming transmission timeslot; additionally, the total number of the UEs in the subset is less than Nt−1;

$\sigma^2$ indicates the power of Gaussian noise at the receiver side;

$h_{d,BS}$ indicates the uplink channel from the D2D transmitter to the BS, which may be a Nt-element vector;

$\overline{P}_c$ indicates the power limitation for the UE(s);

$\overline{P}_d$ indicates the power limitation for the D2D transmitter;

$Q_d$ indicates logarithmic form of transmission power of the D2D transmitter, that is, $Q_d = \log(P_d)$, where $P_d$ indicates the transmission power of the D2D transmitter and $P_d \leq \overline{P}_d$, where $\overline{P}_d$ indicates the power limitation for the D2D transmitter;

$Q_i$ indicates logarithmic form of transmission power of the $i^{th}$ UE, that is, $Q_i = \log(P_i)$ and $P_i \leq \overline{P}_i$, where $\overline{P}_i$ indicates the power limitation for the $i^{th}$ UE;

$v_i$ indicates a beamforming vector for the $i^{th}$ UE at the BS;

$v_d$ indicates receiving beamforming vector for D2D transmitter at the BS;

$h_i$ indicates uplink channel from the $i^{th}$ UE to the BS, which may be a Nt-element vector;

$\epsilon$ indicates outage probability constraint for the D2D link, the outage may not go beyond $\epsilon$, say 5% or so;

$R_d$ indicates the rate requirement for the D2D devices, which is also the rate outage threshold at the D2D receiver. In an embodiment of the present invention, if log(1+ SINR)≥$R_d$, D2D receiver is able to successfully decode the message and the corresponding throughput is $R_d$; otherwise, if log(1+SINR)<$R_d$, the link is in outage and the corresponding throughput is 0;

$\bar{g}_d$ indicates mean (power) value of channel from the D2D transmitter to the D2D receiver; and $\bar{g}_{i,d}$ indicates mean (power) value of channel from the $i^{th}$ UE to the D2D receiver.

It is to be noted that, besides the aforesaid throughput optimization problem, the transmission powers may be determined according to some other policies, e.g., maximizing sum rate. These examples are shows for illustration, rather than limitation.

At step S406, a full power of the D2D transmitter is determined as the D2D transmission power, and a full power of the at least one UE is determined as the at least one cellular transmission power.

This step is performed in response to that the channel quality of the D2D communication does not exceed a predetermined threshold. According to embodiments of the present invention, the channel quality being lower than the predetermined threshold may indicate that the channel quality of the D2D communication is not good enough, that is to say, the D2D communication is in outage. In this case, the D2D transmission power may be determined as the full power of the D2D transmitter. Meanwhile, for one or more UE served by the BS, their respective transmission powers may be determined as their full powers respectively.

As can be appreciated by those skilled in the art, the aforesaid steps S403 to S406 are optional steps for the method according to the present invention. For example, in some embodiments, the full powers may be directly assigned to the D2D transmitter as well as the at least one UE, at the cost of possibility of decreasing the throughput of the communication system.

At step S407, D2D data is received from the D2D transmitter.

Step S407 in method 400 corresponds to step S301 in method 300 as described above. Similar with step S301, the D2D data transmitted from the D2D transmitter is no longer the interference but useful signals for the BS.

At step S408, the received D2D data is transmitted to the D2D receiver in response to receiving a negative message from the D2D receiver. The negative message may indicate that the D2D receiver fails to receive the D2D data from the D2D transmitter.

Step S408 in method 400 corresponds to step S302 in method 300 as described above. Similar with step S302, in response to receiving a negative message from the D2D receiver, the BS may determine that the D2D receiver does not successfully receive the D2D data from the D2D transmitter, and then may transmit the D2D data to the D2D receiver to guarantee successful transmission of the D2D data. According to embodiments of the present invention, several forwarding schemes, such as Amplify-and-Forward, Incremental Amplify-and-Forward, Decode-and-Forward, and Selection Decode-and-Forward, may be employed in embodiments of the present invention.

Compared with the existing solutions, it is advantageous that whether the BS is qualified as a relay in the D2D communication is determined before starting the transmission of the D2D data, because the success ratio of the D2D communication may be effectively improved. Additionally, it is also advantageous that the transmission power of the D2D data is determined, for example based on the channel quality, to improve the throughput of the communication system.

Reference is now made to FIG. 5, which illustrates a flow chart of a method 500 for performing D2D communication in a communication system according to embodiments of the invention. As discussed above, according to embodiments of the present invention, the communication system may at least comprise a BS, a D2D transmitter and a D2D receiver, the D2D transmitter may transmit D2D data to the D2D receiver in a D2D communication, and the communication system may be implemented as a GSM system, a CDMA system, a UMTS system, a LTE system, etc. In accordance with embodiments of the present invention, the method 500 may be carried out by, for example, a D2D receiver, a user equipment, a terminal or any other applicable device.

After method 500 starts, at step S501, a negative message is sent to the D2D transmitter and the BS in response to failing to receive D2D data from the D2D transmitter.

As discussed with reference to FIG. 1, in the existing D2D solutions, the D2D receiver receives the D2D data from the D2D transmitter. Generally, if the D2D data is not successfully received by the D2D receiver, the D2D transmitter may retransmit the D2D data to the D2D receiver.

Different from the existing D2D solutions, in embodiments of the present invention, if the D2D receiver fails to receive D2D data from the D2D transmitter, it may send a negative message, e.g., a NACK (Negative Acknowledgement), to the D2D transmitter as well as the BS. As such, both the D2D transmitter and the BS may be notified the unsuccessful receipt of the D2D data from the D2D transmitter.

At step S502, the D2D data is received from the BS.

According to embodiments of the present invention, in response to the negative message, the BS may transmit the D2D data which is received from the D2D transmitter to the D2D receiver. As such, although the D2D receiver fails to receive the D2D data from the D2D transmitter, the D2D data which is same as that unsuccessfully received from the D2D transmitter may be received from the BS.

In accordance with embodiments of the present invention, optionally, in response to receiving the D2D data from the BS or the D2D transmitter, a positive message may be sent to the D2D transmitter and the BS. In an embodiment, when the D2D receiver receive the D2D data from the D2D transmitter, it may send a positive message, e.g. an ACK (Acknowledgment), to the D2D transmitter to notify that the D2D data is successfully received. In another embodiment, the D2D receiver fails to receive the D2D data from the D2D transmitter at first, but successfully receives the D2D data from the BS, it may send a positive message, e.g. an ACK (Acknowledgment), to the BS and/or the D2D transmitter to notify that the D2D data is successfully received from the BS.

Reference is now made to FIG. 6, which illustrates a flow chart of a method 600 for performing D2D communication in a communication system according to embodiments of the invention. As discussed above, according to embodiments of the present invention, the communication system may at least comprise a BS, a D2D transmitter and a D2D receiver, the D2D transmitter may transmit D2D data to the D2D receiver in a D2D communication, and the communication system may be implemented as a GSM system, a CDMA system, a UMTS system, a LTE system, etc. In accordance with embodiments of the present invention, the method 600 may be carried out by, for example, a D2D transmitter, a user equipment, a terminal or any other applicable device.

After method 600 starts, at step S601, the D2D data is transmitted to the D2D receiver and the BS, so that the BS transmits the D2D data to the D2D receiver in response to receiving a negative message from the D2D receiver.

As discussed above, in the existing D2D solutions, the D2D transmitter transmits the D2D data to the D2D receiver, without transmitting to the BS. At the same time, for the BS, the D2D data is interference for the cellular communication between the BS and its UE(s), especially in uplink cellular communication.

Different from the existing D2D solutions, according to embodiments of the present invention, the D2D transmitter transmits the D2D data to both the D2D receiver and the BS. In an embodiment, the D2D data may be broadcast to the D2D receiver and the BS, wherein an indicator may be set into the D2D data to indicate the targets (e.g., the D2D receiver and the BS) the D2D data is directed to. As such, both the D2D receiver and the BS may receive the D2D data. Accordingly, when the D2D receiver fails to successfully receive the D2D data, the BS may transmits the D2D data to the D2D receiver in response to receiving a negative message from the D2D receiver.

In accordance with embodiments of the present invention, the method 600 may further comprise a step of receiving a positive message, e.g., an ACK, from the D2D receiver, wherein the positive message indicates that the D2D receiver has received the D2D data from the BS or the D2D transmitter.

In accordance with embodiments of the present invention, the method 600 may further comprise a step of receiving a negative message e.g., a NACK, from the D2D receiver, wherein the negative message indicates that the D2D receiver fails to receive the D2D data from the D2D transmitter.

Figure 10A:
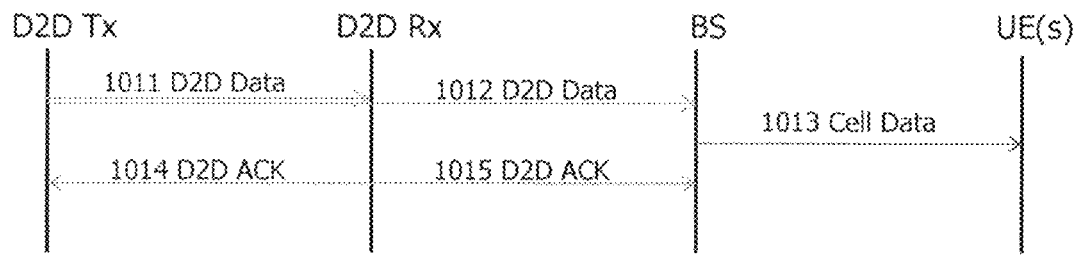
FIG. 10A illustrates a schematic diagram of the D2D communication according to embodiments of the invention.
Figure 10B:
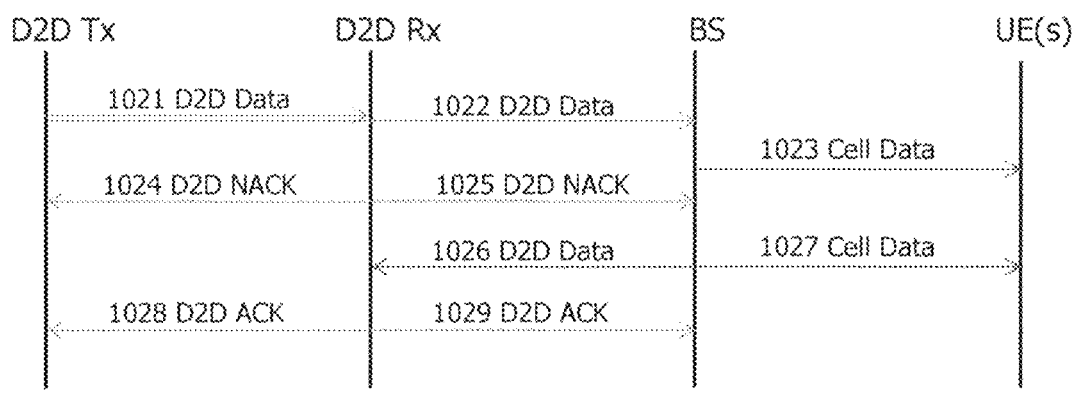
FIG. 10B illustrates a schematic diagram of the D2D communication according to further embodiments of the invention.

For better understanding, reference is now made to FIG. 10A and FIG. 10B, which respectively illustrate a schematic diagram of the D2D communication according to embodiments of the invention.

FIG. 10A illustrates an embodiment for performing D2D communication, wherein the D2D transmitter (i.e., D2D Tx) transmits 1011 D2D data to the D2D receiver (i.e., D2D Rx), meanwhile the D2D transmitter also transmits 1012 the D2D data to the BS. It is to be noted that, in practice, the operations 1011 and 1012 may performed at the same time, that is, the D2D data may be transmitted to the D2D Rx and the BS in one uplink session. After receiving the D2D data from the D2D Tx, in the next downlink session, the BS may transmit 1013 cell data to the UE(s) as in normal cellular communication. In the embodiment shown in FIG. 10A, the D2D Rx successfully receives the D2D data from the D2D Tx, thus sends 1014 a positive message, i.e., D2D ACK to the D2D Tx and sends 1015 D2D ACK to the BS.

FIG. 10B illustrates another embodiment for performing D2D communication, wherein the D2D Tx transmits 1021 D2D data to the D2D Rx, as well as transmits 1022 the D2D data to the BS. It is to be noted that, in practice, the operations 1021 and 1022 may performed at the same time, that is, the D2D data may be transmitted to the D2D Rx and the BS in a same uplink session. After receiving the D2D data from the D2D Tx, in the next downlink session, the BS may transmit 1023 cell data to the UE(s) in normal cellular communication. In the embodiment shown in FIG. 10B, the D2D Rx fails to receive the D2D data from the D2D Tx, thus sends 1024 a negative message, i.e., D2D NACK to the D2D Tx and sends 1025 D2D ACK to the BS. In response to receiving the D2D NACK from the D2D receiver, the BS transmits 1026 the D2D data to the D2D receiver, meanwhile the BS may also transmit 1027 cell data to the UE(s) in normal cellular communication. It is to be noted that the transmissions 1026 and 1027 may be performed in a same downlink session. The D2D RX, in response to receiving the D2D data from the D2D transmitter, may send 1028 a positive message, i.e., D2D ACK to the D2D transmitter as well as send 1029 D2D ACK to the BS.

Figure 7:
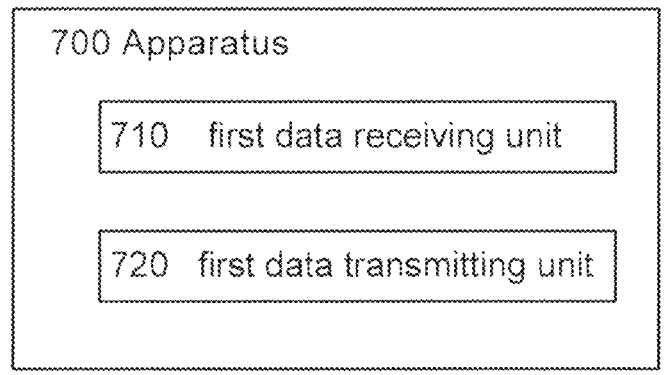
FIG. 7 illustrates a block diagram of an apparatus 700 for performing D2D communication in a communication system according to embodiments of the invention.
Figure 8:
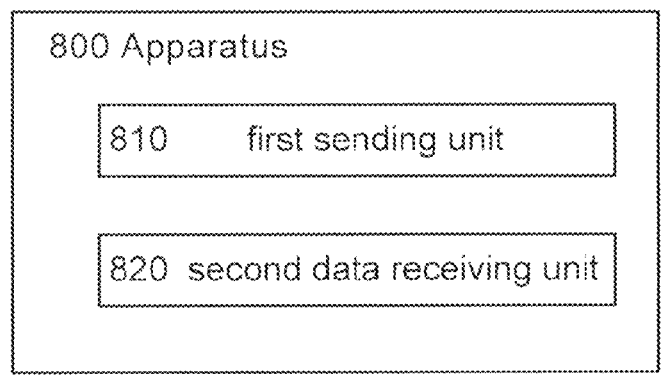
FIG. 8 illustrates a block diagram of an apparatus 800 for performing D2D communication in a communication system according to embodiments of the invention.
Figure 9:
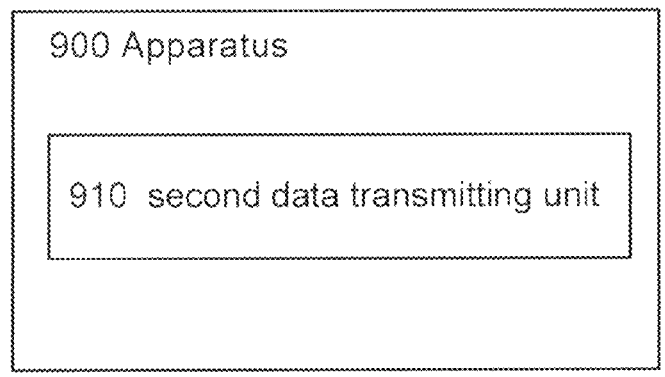
FIG. 9 illustrates a block diagram of an apparatus 900 for performing D2D communication in a communication system according to embodiments of the invention.

FIGS. 7-9 relate to block diagrams of apparatus for performing D2D communication in a communication system according to embodiments of the invention, respectively. As discussed above, in embodiments illustrated with FIGS. 7-9, the communication system may at least comprise a BS, a D2D transmitter and a D2D receiver, the D2D transmitter may transmit D2D data to the D2D receiver in a D2D communication, and the communication system may be implemented as a GSM system, a CDMA system, a UMTS system, a LTE system, etc.

Reference is now made to FIG. 7, which illustrates a block diagram of an apparatus 700 for performing D2D communication in a communication system according to embodiments of the invention. In accordance with embodiments of the present invention, the apparatus 700 may be implemented in, for example, a base station, a base station controller (BSC), a gateway, a relay, a server, or any other applicable device.

As shown, the apparatus 700 comprises: a first data receiving unit 710 configured to receive D2D data from the D2D transmitter; and a first data transmitting unit 720 configured to transmit the received D2D data to the D2D receiver in response to receiving a negative message from the D2D receiver, wherein the negative message indicates that the D2D receiver fails to receive the D2D data from the D2D transmitter.

In accordance with embodiments of the present invention, the apparatus 700 may further comprise: a first determining unit configured to determine a D2D transmission power for transmitting the D2D data from the D2D transmitter. According to embodiments of the disclosure, the first determining unit may comprise: a first obtaining unit configured to obtain a channel quality of the D2D communication; a second determining unit configured to determine whether the channel quality exceeds a predetermined threshold; a first calculating unit configured to calculate, responsive to determining that the channel quality exceeds a predetermined threshold, the D2D transmission power and at least one cellular transmission power for the at least one UE so as to maximize throughput of the communication system; and a third determining unit configured to determine, responsive to determining that the channel quality does not exceed the predetermined threshold, a full power of the D2D transmitter as the D2D transmission power and a full power of the at least one UE as the at least one cellular transmission power.

In accordance with embodiments of the present invention, the apparatus 700 may further comprise: a second obtaining unit configured to obtain a D2D rate required by the D2D communication; and a fourth determining unit configured to determine whether the BS is qualified as a relay in the D2D communication based on the D2D rate. According to embodiments of the disclosure, the fourth determining unit may comprise: a second calculating unit configured to calculate a candidate rate based on power limitation for the D2D transmitter and a channel from the D2D transmitter to the BS, or based on power limitation for the BS and a channel from the BS to the D2D receiver; a fifth determining unit configured to determine whether the candidate rate exceeds the D2D rate; a sixth determining unit configured to determine that the BS is qualified as a relay in the D2D communication, responsive to determining that the candidate rate exceeds the D2D rate; and a seventh determining unit configured to determine that the BS is not qualified as a relay in the D2D communication responsive to determining that the candidate rate does not exceed the D2D rate.

Reference is now made to FIG. 8, which illustrates a block diagram of an apparatus 800 for performing D2D communication in a communication system according to embodiments of the invention. In accordance with embodiments of the present invention, the apparatus 800 may be implemented in, for example, a D2D receiver, a user equipment, a terminal or any other applicable device.

As shown, the apparatus 800 comprises: a first sending unit 810 configured to send a negative message to the D2D transmitter and the BS in response to failing to receive D2D data from the D2D transmitter; and a second data receiving unit 820 configured to receive the D2D data from the BS.

In accordance with embodiments of the present invention, the apparatus 800 may further comprise: a second sending unit configured to send a positive message to the D2D transmitter and the BS in response to receiving the D2D data from the BS or the D2D transmitter.

Reference is now made to FIG. 9, which illustrates a block diagram of an apparatus 900 for performing D2D communication in a communication system according to embodiments of the invention. In accordance with embodiments of the present invention, the apparatus 900 may be implemented in, for example, a D2D transmitter, a user equipment, a terminal or any other applicable device.

As shown, the apparatus 900 comprises: a second data transmitting unit 910 configured to transmit D2D data to the D2D receiver and the BS, so that the BS transmits the D2D data to the D2D receiver in response to receiving a negative message from the D2D receiver.

In accordance with embodiments of the present invention, the apparatus 900 may further comprise: a first message receiving unit configured to receive a positive message from the D2D receiver, wherein the positive message indicates that the D2D receiver has received the D2D data from the BS or the D2D transmitter.

In accordance with embodiments of the present invention, the apparatus 800 may further comprise: a second message receiving unit configured to receive a negative message from the D2D receiver, wherein the negative message indicates that the D2D receiver fails to receive the D2D data from the D2D transmitter.

It is also to be noted that the first data receiving unit 710, the first data transmitting unit 720, the first sending unit 810, the second data receiving unit 820 and the second data transmitting unit 910 may be respectively implemented by any suitable technique either known at present or developed in the future. Further, a single device shown in FIG. 7, FIG. 8 or FIG. 9 may be alternatively implemented in multiple devices separately, and multiple separated devices may be implemented in a single device. The scope of the present invention is not limited in these regards.

It is noted that the apparatus 700 may be configured to implement functionalities as described with reference to FIGS. 3-4, the apparatus 800 may be configured to implement functionalities as described with reference to FIG. 5, and the apparatus 900 may be configured to implement functionalities as described with reference to FIG. 6. Therefore, the features discussed with respect to any of methods 300 and 400 may apply to the corresponding components of the apparatus 700, the features discussed with respect to the method 500 may apply to the corresponding components of the apparatus 800, and the features discussed with respect to the method 600 may apply to the corresponding components of the apparatus 900. It is further noted that the components of the apparatus 700, the apparatus 800 or the apparatus 900 may be embodied in hardware, software, firmware, and/or any combination thereof. For example, the components of the apparatus 700, the apparatus 800 or the apparatus 900 may be respectively implemented by a circuit, a processor or any other appropriate device. Those skilled in the art will appreciate that the aforesaid examples are only for illustration not limitation.

In some embodiment of the present disclosure, each of the apparatus 700, the apparatus 800 and the apparatus 900 may comprise at least one processor. The at least one processor suitable for use with embodiments of the present disclosure may include, by way of example, both general and special purpose processors already known or developed in the future. Each of the apparatus 700, the apparatus 800 and the apparatus 900 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 700 to at least perform according to any of methods 300 and 400 as discussed above, to cause the apparatus 800 to at least perform according to method 500 as discussed above, or to cause the apparatus 900 to at least perform according to method 600 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 3-6 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method for performing D2D (Device-to-Device) communication in a communication system, wherein the communication system at least comprises a base station (BS), a D2D transmitter and a D2D receiver, and wherein the D2D transmitter transmits D2D data to the D2D receiver in a D2D communication, the method comprising:
   the BS receiving D2D data from the D2D transmitter; and
   in response to receiving a negative message from the D2D receiver, the BS transmitting the received D2D data to the D2D receiver, wherein the negative message indicates that the D2D receiver fails to receive the D2D data from the D2D transmitter.

2. The method of claim 1, further comprising:
   the BS determining a D2D transmission power for transmitting the D2D data from the D2D transmitter.

3. The method of claim 2, wherein at least one user equipment (UE) is served by the BS, and wherein the BS determining a D2D transmission power for transmitting the D2D data from the D2D transmitter comprises:
   obtaining a channel quality of the D2D communication;
   determining whether the channel quality exceeds a predetermined threshold;
   responsive to determining that the channel quality exceeds a predetermined threshold, calculating the D2D transmission power and at least one cellular transmission power for the at least one UE so as to maximize throughput of the communication system; and
   responsive to determining that the channel quality does not exceed the predetermined threshold, determining a full power of the D2D transmitter as the D2D transmission power, and a full power of the at least one UE as the at least one cellular transmission power.

4. The method of claim 1, further comprising:
   the BS obtaining a D2D rate required by the D2D communication; and
   the BS determining whether the BS is qualified as a relay in the D2D communication based on the D2D rate.

5. The method of claim 4, wherein the BS determining whether the BS is qualified as a relay in the D2D communication based on the D2D rate comprises:
 calculating a candidate rate based on power limitation for the D2D transmitter and a channel from the D2D transmitter to the BS, or based on power limitation for the BS and a channel from the BS to the D2D receiver;
 determining whether the candidate rate exceeds the D2D rate;
 responsive to determining that the candidate rate exceeds the D2D rate, determining that the BS is qualified as a relay in the D2D communication; and
 responsive to determining that the candidate rate does not exceed the D2D rate, determining that the BS is not qualified as a relay in the D2D communication.

6. A method for performing D2D (Device-to-Device) communication in a communication system, wherein the communication system at least comprises a base station (BS), a D2D transmitter and a D2D receiver, and wherein the D2D transmitter transmits D2D data to the D2D receiver in a D2D communication, the method comprising:
 in response to failing to receive D2D data from the D2D transmitter, the D2D receiver sending a negative message to the D2D transmitter and the BS; and
 the D2D receiver receiving the D2D data from the BS.

7. The method of claim 6, further comprising:
 in response to receiving the D2D data from the BS or the D2D transmitter, the D2D receiver sending a positive message to the D2D transmitter and the BS.

8. A method for performing D2D (Device-to-Device) communication in a communication system, wherein the communication system at least comprises a base station (BS), a D2D transmitter and a D2D receiver, and wherein the D2D transmitter transmits D2D data to the D2D receiver in a D2D communication, the method comprising:
 the D2D transmitter transmitting D2D data to the D2D receiver and the BS, so that the BS transmits the D2D data to the D2D receiver in response to receiving a negative message from the D2D receiver.

9. The method of claim 8, further comprising:
 the D2D transmitter receiving a positive message from the D2D receiver, wherein the positive message indicates that the D2D receiver has received the D2D data from the BS or the D2D transmitter.

10. The method of claim 8, further comprising:
 the D2D transmitter receiving a negative message from the D2D receiver, wherein the negative message indicates that the D2D receiver fails to receive the D2D data from the D2D transmitter.

11. A base station (BS) for performing D2D (Device-to-Device) communication in a communication system, wherein the communication system at least comprises the BS, a D2D transmitter and a D2D receiver, and wherein the D2D transmitter transmits D2D data to the D2D receiver in a D2D communication, the BS comprising:
 a first data receiving unit configured to receive D2D data from the D2D transmitter; and
 a first data transmitting unit configured to transmit the received D2D data to the D2D receiver in response to receiving a negative message from the D2D receiver, wherein the negative message indicates that the D2D receiver fails to receive the D2D data from the D2D transmitter.

12. The BS of claim 11, further comprising:
 a first determining unit configured to determine a D2D transmission power for transmitting the D2D data from the D2D transmitter.

13. The BS of claim 12, wherein the first determining unit comprises:
 a first obtaining unit configured to obtain a channel quality of the D2D communication;
 a second determining unit configured to determine whether the channel quality exceeds a predetermined threshold;
 a first calculating unit configured to calculate, responsive to determining that the channel quality exceeds a predetermined threshold, the D2D transmission power and at least one cellular transmission power for the at least one user equipment (UE) so as to maximize throughput of the communication system; and
 a third determining unit configured to determine, responsive to determining that the channel quality does not exceed the predetermined threshold, a full power of the D2D transmitter as the D2D transmission power and a full power of the at least one UE as the at least one cellular transmission power.

14. The BS of claim 11, further comprising:
 a second obtaining unit configured to obtain a D2D rate required by the D2D communication; and
 a fourth determining unit configured to determine whether the BS is qualified as a relay in the D2D communication based on the D2D rate.

15. The BS of claim 14, wherein the fourth determining unit comprises:
 a second calculating unit configured to calculate a candidate rate based on power limitation for the D2D transmitter and a channel from the D2D transmitter to the BS, or based on power limitation for the BS and a channel from the BS to the D2D receiver;
 a fifth determining unit configured to determine whether the candidate rate exceeds the D2D rate;
 a sixth determining unit configured to determine that the BS is qualified as a relay in the D2D communication, responsive to determining that the candidate rate exceeds the D2D rate; and
 a seventh determining unit configured to determine that the BS is not qualified as a relay in the D2D communication responsive to determining that the candidate rate does not exceed the D2D rate.

16. A Device-to-Device (D2D) receiver for performing D2D communication in a communication system, wherein the communication system at least comprises a base station (BS), a D2D transmitter and the D2D receiver, and wherein the D2D transmitter transmits D2D data to the D2D receiver in a D2D communication, the D2D receiver comprising:
 a first sending unit configured to send a negative message to the D2D transmitter and the BS in response to failing to receive D2D data from the D2D transmitter; and
 a second data receiving unit configured to receive the D2D data from the BS.

17. The D2D receiver of claim 16, further comprising:
 a second sending unit configured to send a positive message to the D2D transmitter and the BS in response to receiving the D2D data from the BS or the D2D transmitter.

18. A D2D transmitter for performing D2D communication in a communication system, wherein the communication system at least comprises a base station (BS), the D2D transmitter and a D2D receiver, and wherein the D2D transmitter transmits D2D data to the D2D receiver in a D2D communication, the D2D transmitter comprising:
 a second data transmitting unit configured to transmit D2D data to the D2D receiver and the BS, so that the BS transmits the D2D data to the D2D receiver in response to receiving a negative message from the D2D receiver.

19. The D2D transmitter of claim 18, further comprising:
a first message receiving unit configured to receive a positive message from the D2D receiver, wherein the positive message indicates that the D2D receiver has received the D2D data from the BS or the D2D transmitter.

20. The D2D transmitter of claim 18, further comprising:
a second message receiving unit configured to receive a negative message from the D2D receiver, wherein the negative message indicates that the D2D receiver fails to receive the D2D data from the D2D transmitter.

* * * * *